(12) United States Patent
Lee et al.

(10) Patent No.: US 11,615,814 B2
(45) Date of Patent: Mar. 28, 2023

(54) VIDEO AUTOMATIC EDITING METHOD AND SYSTEM BASED ON MACHINE LEARNING

(71) Applicant: SMSYSTEMS CO., LTD, Seoul (KR)

(72) Inventors: Seung Hwan Lee, Seoul (KR); Yo Namkung, Seoul (KR)

(73) Assignee: SMSYSTEMS CO., LTD, Seoul (KR)

( * ) Notice: Subject to any disclaimer, the term of this patent is extended or adjusted under 35 U.S.C. 154(b) by 0 days.

(21) Appl. No.: 17/495,749

(22) Filed: Oct. 6, 2021

(65) Prior Publication Data
US 2022/0319549 A1    Oct. 6, 2022

(30) Foreign Application Priority Data
Apr. 6, 2021 (KR) .......... 10-2021-0044347

(51) Int. Cl.
 *G11B 27/02* (2006.01)
 *G06V 20/40* (2022.01)
 *G06F 18/214* (2023.01)

(52) U.S. Cl.
 CPC .......... *G11B 27/02* (2013.01); *G06F 18/2148* (2023.01); *G06V 20/46* (2022.01)

(58) Field of Classification Search
 CPC ....... G11B 27/02; G06V 20/46; G06K 9/6257
 See application file for complete search history.

(56) References Cited

U.S. PATENT DOCUMENTS

| | | | |
|---|---|---|---|
| 2014/0023348 A1* | 1/2014 | O'Kelly | G11B 27/031 386/278 |
| 2014/0328570 A1* | 11/2014 | Cheng | H04N 21/8549 386/241 |
| 2021/0093973 A1* | 4/2021 | Edridge | A63F 13/424 |

\* cited by examiner

*Primary Examiner* — Thai Q Tran
*Assistant Examiner* — Jose M Mesa
(74) *Attorney, Agent, or Firm* — Park, Kim & Suh, LLC (57) ABSTRACT

Disclosed are a video automatic editing method and system based on machine learning. The video automatic editing system based on machine learning includes at least one processor, and the at least one processor includes a video acquirer configured to acquire input video, a highlight frame extractor configured to extract at least one highlight frame from the input video using a highlight extraction model pre-trained through machine learning, and a highlight video generator configured to generate highlight video from the at least one extracted highlight frame.

10 Claims, 10 Drawing Sheets

VIDEO AUTOMATIC EDITING METHOD AND SYSTEM BASED ON MACHINE LEARNING

CROSS-REFERENCE TO RELATED APPLICATIONS

This application claims the benefit of Korean Patent Application No. 10-2021-0044347, filed on Apr. 6, 2021, which is hereby incorporated by reference as if fully set forth herein.

BACKGROUND OF THE INVENTION

Field of the Invention

The following disclosure relates to a video automatic editing system and method, and more particularly to video automatic editing technology using machine learning.

Discussion of the Related Art

Video content is divided into long-form video content or short-form video content depending on the length thereof. The long-form video content is sometimes created with a long length (e.g., 15 minutes or banger) to include all frames of the filmed video without editing, but the short-form video content is capable of being edited and created with a short length (e.g., 1 to 15 minutes) to include some frames of frames of the filmed video.

Recently, due to remarkable growth of the single-person broadcasting market, a demand for short-form video content to increase viewers has increased. Accordingly, there is a need to propose technology for editing and creating short-form video content.

SUMMARY OF THE INVENTION

Embodiments propose a video automatic editing system and method for automatically creating highlight video that is short-form video content using a highlight extraction model that is pre-trained through machine learning in order to prevent inconvenience of creating short-form video content by single creators and to improve the quality of the short-form video content.

However, the technical problems solved by the embodiments may not be limited to the above technical problems and may be variously expanded without are departing from the spirit and scope of the present disclosure.

In accordance with an aspect of the present disclosure, the above and other objects can be accomplished by the provision of a video automatic editing system based on machine learning including at least one processor, wherein the at least one processor includes a video acquirer configured to acquire input video, a highlight frame extractor configured to extract at least one highlight frame from the input video using a highlight extraction model pre-trained through machine learning, and a highlight video generator configured to generate highlight video from the at least one extracted highlight frame.

According to an aspect, the highlight frame extractor may calculate a score for each of frames included in the input video using the highlight extraction model and may extract the at least one highlight frame based on the score for each of frames included in the input video.

According to another aspect, the highlight frame extractor may calculate the score for each of frames included in the input video based on frame information of each of the frames included in the input video, the frame information including expression, movement, and a position of a person in each of the frames included in the input video, speech content, a speech size, and speech speed of the person, a type and change of an object, a type and size of sound, or reaction of viewers who watch the input video.

According to another aspect, the score for each of the frames included in the input video may indicate a frequency at which frame information of each of the frames included in the input video is repeated in the input video.

According to another aspect, the score for each of the frames included in the input video may indicate a degree by which frame information of each of the frames included in the input video is different from frame information of each of remaining.

According to another aspect, the score for each of the frames included in the input video may indicate a degree by which frame information of each of the frames included in the input video is important.

According to another aspect, the highlight frame extractor may determine the degree by which frame information of each of the frames included in the input video is important depending on a degree by which the frame information of each of the frames included in the input video is matched to preset reference frame information.

According to another aspect, in response to extraction of frames before and after a preset range together based on the at least one extracted highlight frame, the highlight video generator may generate the highlight video by combining the at least one extracted highlight frame and the before and after frames.

According to another aspect, the highlight frame extractor may calculate the score for each of the frame included in the input video using a calculation method selected in response to user input for calculation methods of calculating the score of each of the frames included in the input video.

According to another aspect, the highlight extraction model may be pre-trained through the machine learning based on expression, movement, a position, speech content, a speech size, and speech speed of a person in learning videos including the input video, a type and change of an object, a type and size of sound, or reaction of viewers who watch the learning videos.

According to an embodiment, a video automatic editing method based on machine learning performed by a computer includes acquiring input video, extracting at least one highlight frame from the input video using a highlight extraction model pre-trained through machine learning, and generating highlight video from the at least one extracted highlight frame.

According to an aspect, the extracting may include calculating a score for each of frames included in the input video using the highlight extraction model, and extracting the at least one highlight frame based on the score for each of frames included in the input video.

According to another aspect, the calculating may include calculating the score for each of frames included in the input video based on frame information of each of the frames included in the input video, the frame information including expression, movement, and a position of a person in each of the frames included in the input video, speech content, a speech size, and speech speed of the person, a type and change of an object, a type and size of sound, or reaction of viewers who watch the input video.

According to an embodiment, a computer-readable recording medium having recorded thereon a program for executing a video automatic editing method based on machine learning, the method including acquiring input video, extracting at least one highlight frame from the input video using a highlight extraction model pre-trained through machine learning, and generating highlight video from the at least one extracted highlight frame.

BRIEF DESCRIPTION OF THE DRAWINGS

The accompanying drawings, which are included to provide a further understanding of the present disclosure and are incorporated in and constitute a part of this application, illustrate embodiment(s) of the present disclosure and together with the description serve to explain the principle of the present disclosure. In the drawings.

DETAILED DESCRIPTION OF THE INVENTION

The attached drawings for illustrating exemplary embodiments of the present disclosure are to be referred to in order to gain a sufficient understanding of the present disclosure, the merits thereof, the objectives accomplished by the implementation of the present disclosure, and a method of achieving them. The present disclosure may, however, be embodied in many different forms, and should not be construed as being limited to the embodiments set forth herein; rather, these embodiments are provided so that this disclosure will be thorough and complete, and will fully convey the concept of the present disclosure to one of ordinary skill in the art.

The terminology used herein is for the purpose of describing particular embodiments and is not intended to limit the present disclosure. An expression in the singular encompasses the expression in the plural, unless it has a clearly different meaning in context. It is to be understood that terms such as "comprise" and/or "comprising" are intended to indicate the presence of the components, steps, operations, and/or devices, and are not intended to preclude the possibility that one or more other components, steps, operations, and/or devices may exist or may be added.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having meanings that are consistent with their meanings in the context of the relevant art and will not be interpreted in an idealized or overly formal sense unless expressly so defined herein.

The present disclosure will now be described more fully with reference to the accompanying drawings, in which exemplary embodiments of the present disclosure are shown. In the drawings, the same elements are denoted by the same reference numerals, and a repeated explanation thereof will not be given.

Figure 1:
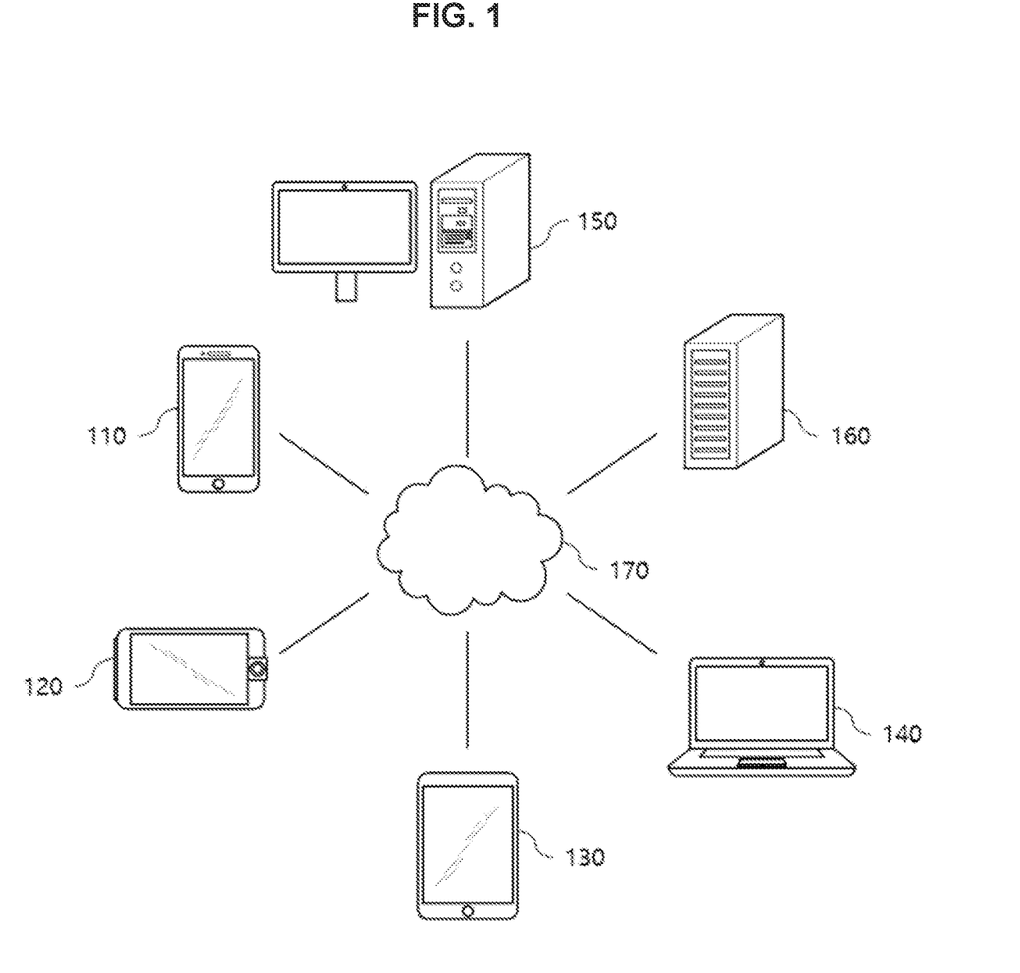
FIG. 1 is a diagram showing an example of a network environment according to an embodiment.

FIG. 1 is a diagram showing an example of a network environment according to an embodiment. FIG. 1 shows an example of the network environment containing a plurality of electronic devices 110, 120, 130, 140, and 150, a server 160, and a network 170. FIG. 1 shows an example for explaining the disclosure, and the number of electronic devices or the number of servers is not limited to FIG. 1.

The plurality of electronic devices 110, 120, 130, 140, and 150 may be implemented as a computer device and may be a terminal for providing a video automatic editing service to a user of each of the plurality of electronic devices 110, 120, 130, 140, and 150. The plurality of electronic devices 110, 120, 130, 140, and 150 may be, for example, a smart phone, a portable phone, a tablet PC, a navigation device, a computer, a notebook computer, a digital broadcasting terminal, personal digital assistants (PDA), a portable multimedia player (PMP), a user wearable device. For example, a first electronic device 110 may communicate with other electronic devices 120, 130, 140, and 150, and/or the server 160 through the network 170 using a wireless or wired communication method.

A communication method is not limited and may also include short-range wireless communication between devices as well as a communication method using a communication network (e.g., a mobile communication network, wired Internet, wireless Internet, or a broadcast network) to be included in the network 170. For example, the network 170 may include one or more arbitrary networks of a personal area network (PAN), a local area network (LAN), a campus area network (CAN), a metropolitan area network (MAN), a wide area network (WAN), a broadband network (BBN), and the Internet. In addition, the network 170 may include one or more arbitrary network topologies including a bus network, a star network, a ring network, a mesh network, a star-bus network, or a tree or hierarchical network, but is not limited thereto.

The server 160 may communicate with the plurality of electronic devices 110, 120, 130, 140, and 150 through the network 170 and may be implemented as a computer device or a plurality of computer devices for providing instruction, code, a file, content, a service, or the like.

For example, the server 160 may provide a file for installing an application to the first electronic device 110 that the server 160 accesses through the network 170. In this case, the first electronic device 110 may install the application using the file provided from the server 160. The first electronic device 110 may access the server 160 to be provided with a service or content provided by the server 160 under control of an operating system (OS) or at least one program (e.g., a browser or the installed application) included in the first electronic device 110. For example, when the first electronic device 110 transmits a service request message to the server 160 through the network 170 under control of the application, the server 160 may transmit code corresponding to a service request message to the first electronic device 110, and the first electronic device 110 may configure and display video based on the code to provide content to a user under control of the application.

Figure 2:
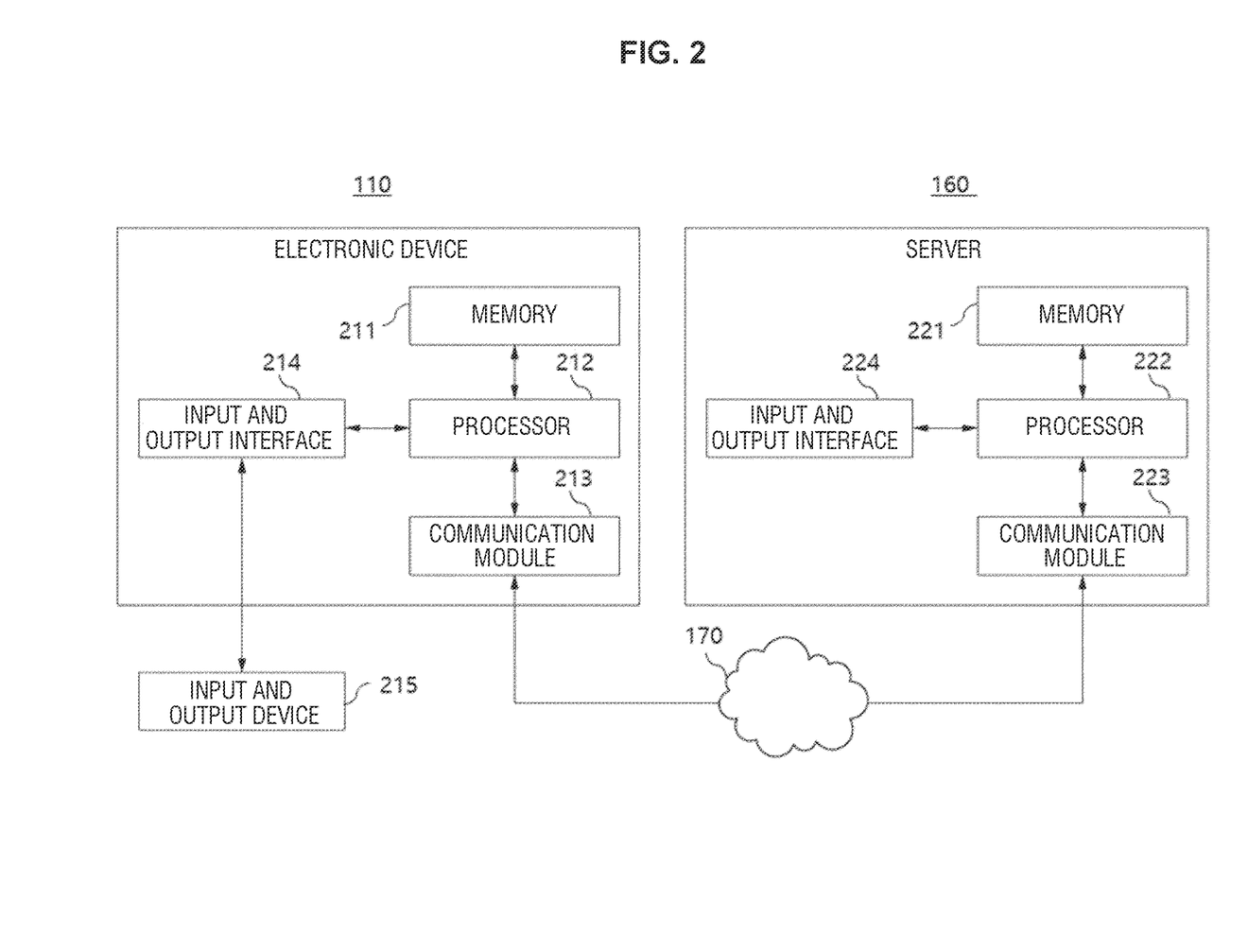
FIG. 2 is a block diagram for explaining the internal configurations of an electronic device and a server according to an embodiment.

FIG. 2 is a block diagram for explaining the internal configurations of an electronic device and a server according to an embodiment. With reference to FIG. 2, the internal configuration of the first electronic device 110 as an example of one electronic device that is a terminal owned by a user provided with a video automatic editing service and the internal configuration of the server 160 as an example of one server that is an entity for communicating a terminal of the user to provide a video automatic editing service will be described. Accordingly, hereinafter, the first electronic device 110 may refer to a user terminal and the server 160 may refer to a server that communicates with the user terminal.

The first electronic device 110 and the server 160 may include memories 211 and 221, processors 212 and 222, communication modules 213 and 223, and input and output interfaces 214 and 224, respectively. The memories 211 and 221 may be a computer readable recording medium and may include a permanent mass storage device such as random access memory (RAM), read only memory (ROM), and disk drive. The memories 211 and 221 may store an operating system (OS) or at least one program code (e.g., code for an application installed and driven in the first electronic device 110). Such software components may be loaded from a separate computer readable recording medium from the memories 211 and 221. The separate computer readable recording medium may include a computer readable recording medium such as a floppy drive, a disk, a tape, DVD/CD-ROM drive, or a memory card. According to another embodiment, the software components may be loaded to the memories 211 and 221 through the communication modules 213 and 223 but not a computer readable recording medium. For example, at least one program may be loaded to the memories 211 and 221 based on a program (e.g., the aforementioned application) installed by files provided through the network 170 by developers or a file distribution system for distribution a file for installing an application.

The processors 212 and 222 may be configured to process instruction of a computer program by performing basic arithmetic, logic, and input and output operations. The instruction may be provided to the processors 212 and 222 by the memories 211 and 221 or the communication modules 213 and 223. For example, the processors 212 and 222 may be configured to execute received instruction according to program code stored in a recording device such as the memories 211 and 221.

The communication modules 213 and 223 may provide a function for communication between the first electronic device 110 and the server 160 through the network 170 and may provide a function for communication with other electronic devices (e.g., a second electronic device 120, a third electronic device 130, a fourth electronic device 140, or a fifth electronic device 150) or another server. For example, a request (a request for the video automatic editing service) created according to the program code stored in a recording device such as the memory 211 by the processor 212 of the first electronic device 110 may be transferred to the server 160 through the network 170 under control of the communication module 213. Inversely, a control signal, instruction, content, a file, etc. provided under control of the processor 222 of the server 160 may be received by the first electronic device 110 through the communication module 213 of the first electronic device 110 via the communication module 223 or the network 170. For example, a control signal, instruction, or the like of the server 160, received through the communication module 213, may be transferred to the processor 212 or the memory 211, and content, a file, or the like may be stored in a storage medium to be further included in the first electronic device 110.

The input and output interface 214 may be a component for interfacing with an input and output device 215. For example, an input device may include a device such as keyboard or a mouse, and an output device may include a device such as a display for displaying a communication session of an application. In another example, the input and output interface 214 may be a component for an interface with a device in which functions for input and output are integrated, such as a touchscreen. In a more specific example, service video or content that is configured using data provided by the server 160 or the second electronic device 120 when the processor 212 of the first electronic device 110 processes instruction of a computer program loaded to the memory 211 may be displayed on a display through the input and output interface 214. Similarly, the input and output interface 224 may output information configured using data provided by the server 160 when the processor 222 of the server 160 processes instruction of a computer program loaded to the memory 221.

According to another embodiment, the first electronic device 110 and the server 160 may include a greater number of components than the components of FIG. 2. However, there is no need to dearly show most of the prior art components. For example, the first electronic device 110 may be implanted to include at least a portion of the aforementioned input and output device 215 or may further include other components such as a transceiver, a global positioning system (GPS) module, a camera, various sensors, or a database.

Hereinafter, a video automatic editing method and system will be described in more detail.

Figure 3:
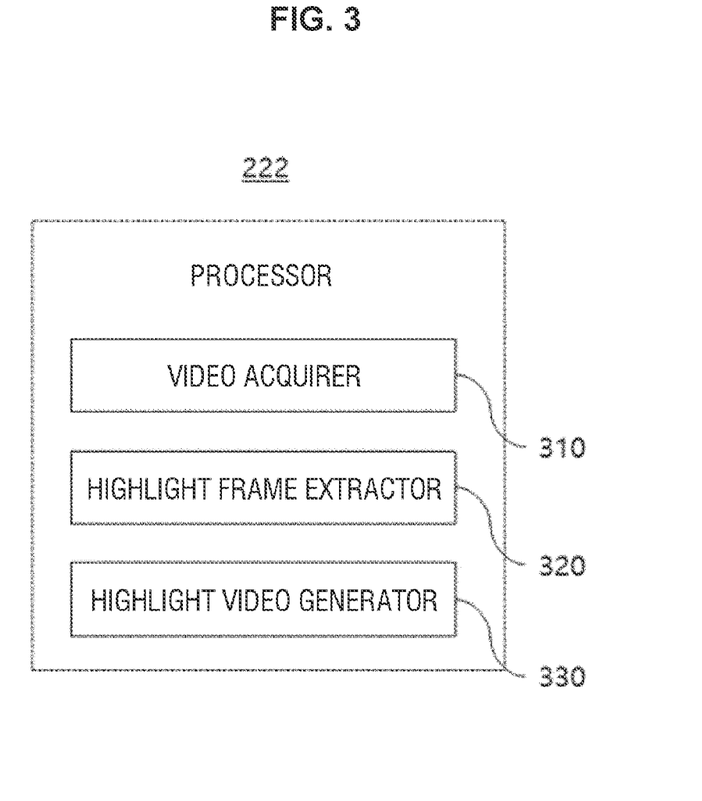
FIG. 3 is a block diagram showing components to be included in a processor of a server according to an embodiment.
Figure 4:
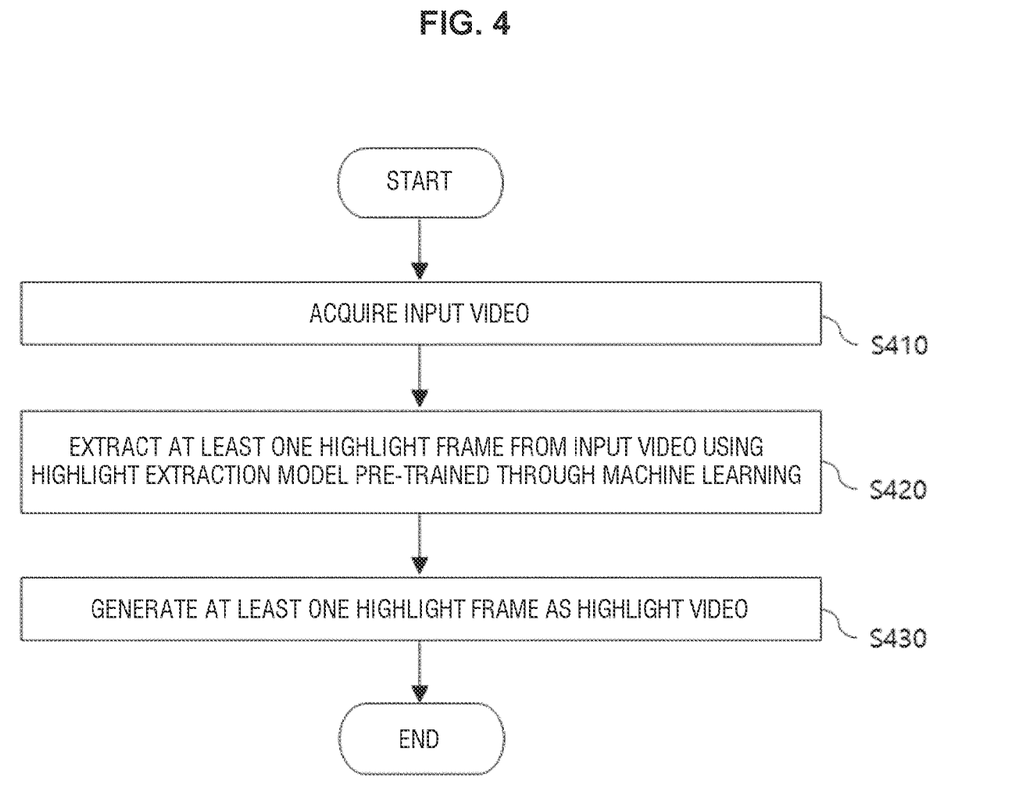
FIG. 4 is a flowchart showing a video automatic editing method based on machine learning according to an embodiment.
Figure 5:
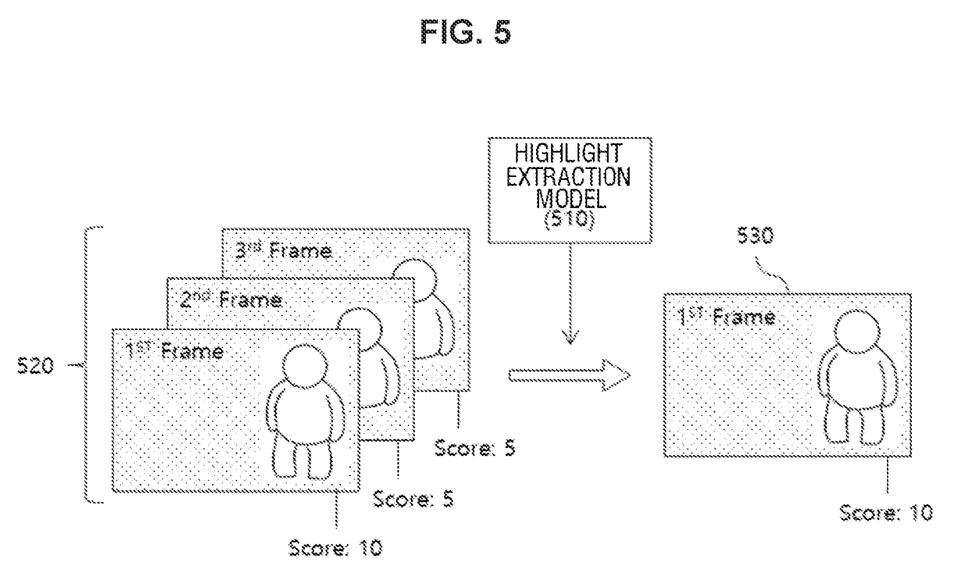
FIG. 5 is a diagram showing an example in which at least one highlight frame is extracted in the video automatic editing method based on machine learning shown in FIG. 4.
Figure 6:
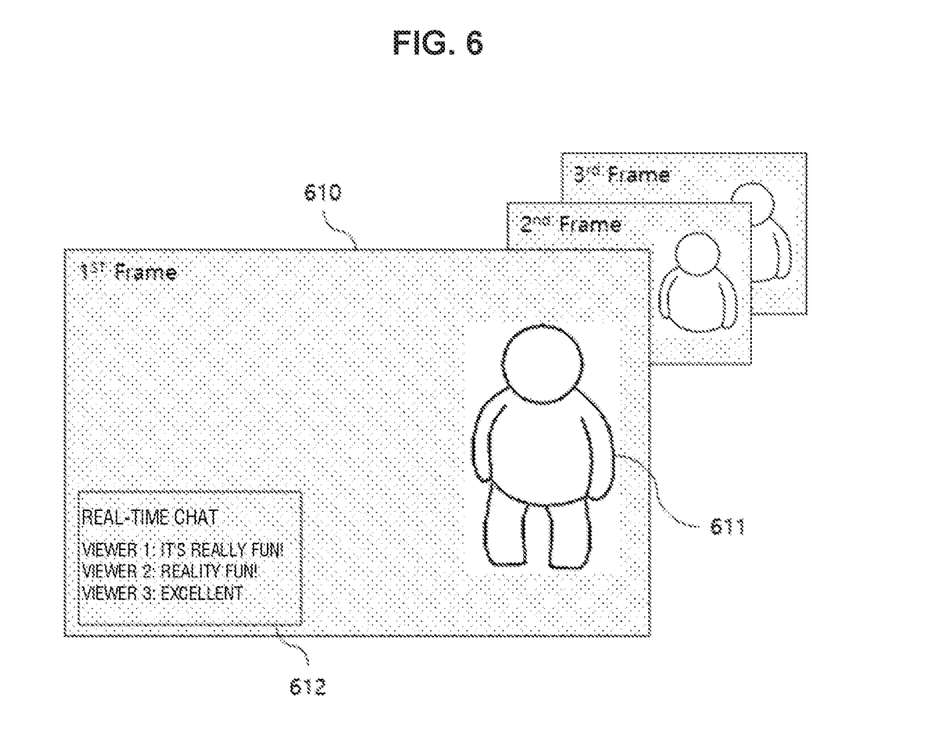
FIG. 6 is a diagram showing an example in which frame information of each of frames included in input video is recognized in the video automatic editing method based on machine learning shown in FIG. 4.
Figure 7:
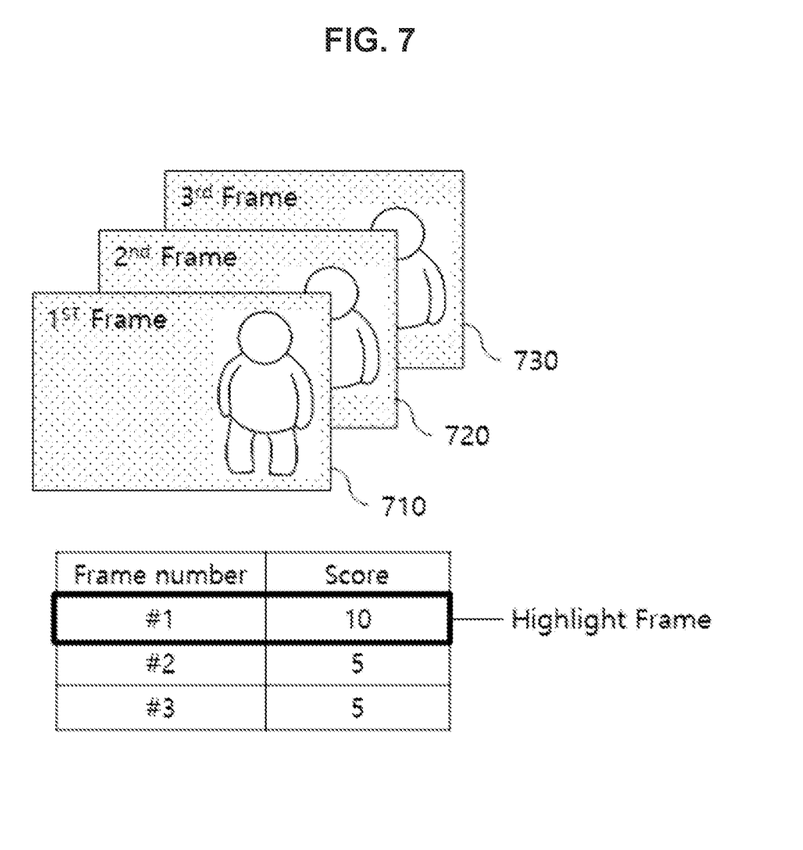
FIG. 7 is a diagram showing an example of a table used to extract at least one highlight frame in the video automatic editing method based on machine learning shown in FIG. 4.
Figure 8:
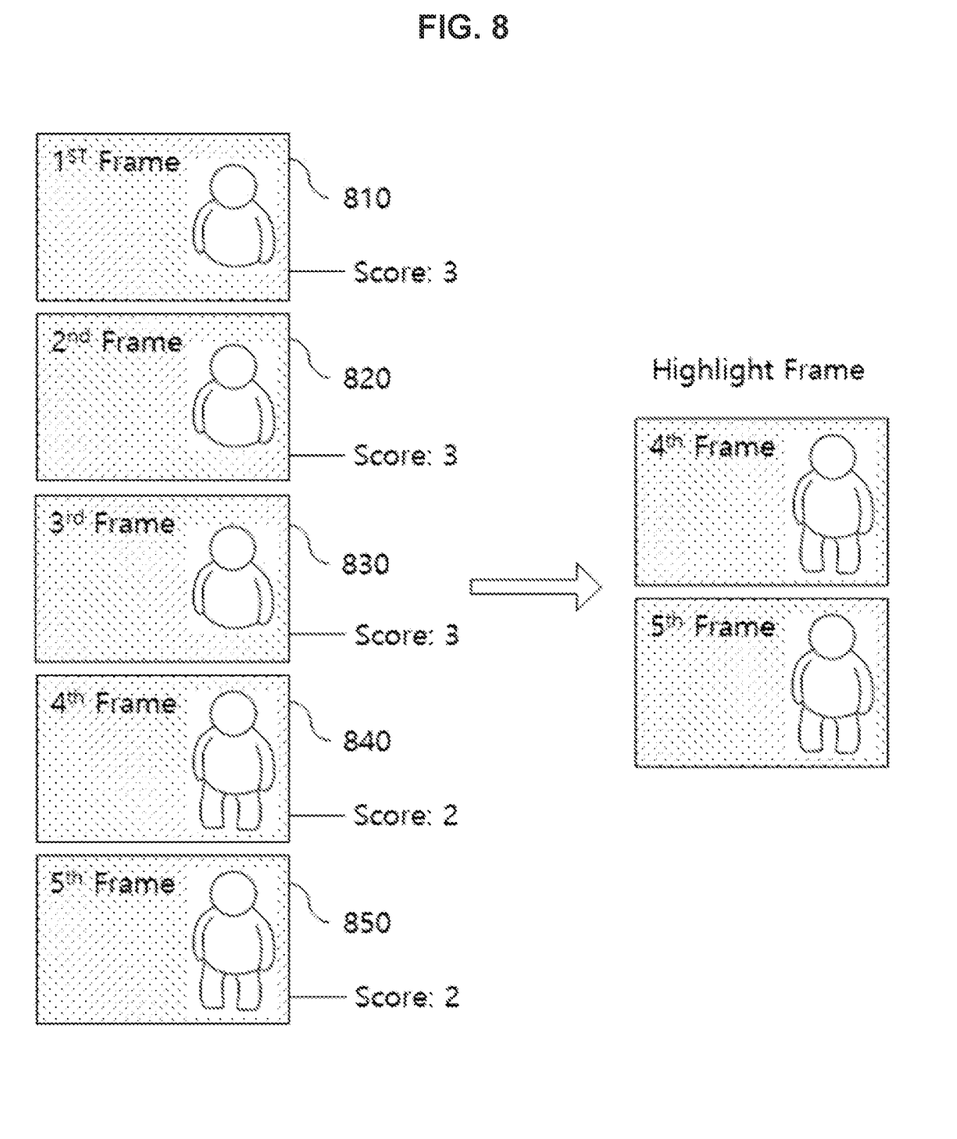
FIGS. 8 to 10 are diagrams showing frames included in input video for description of calculation methods of calculating a score for a frame in the video automatic editing method based on machine learning shown in FIG. 4.
Figure 9:
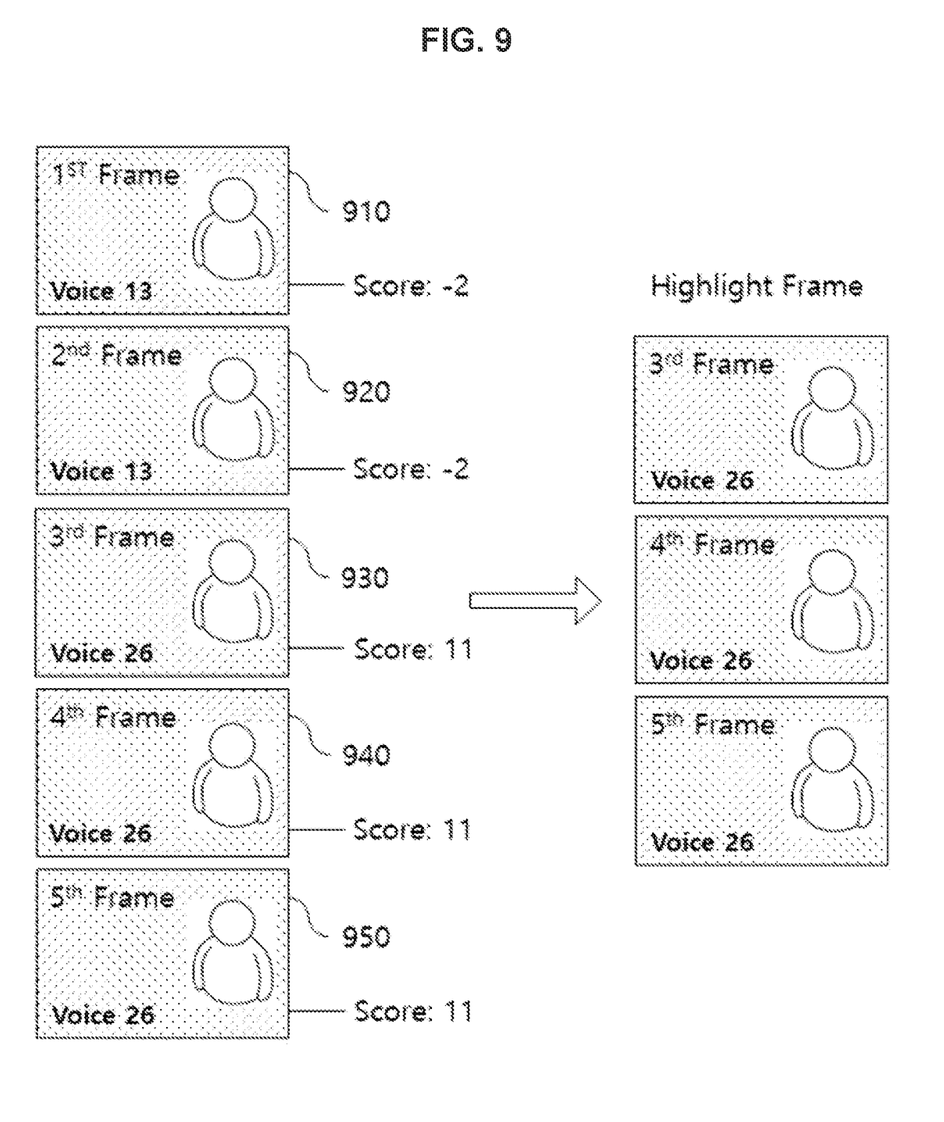
Figure 10:
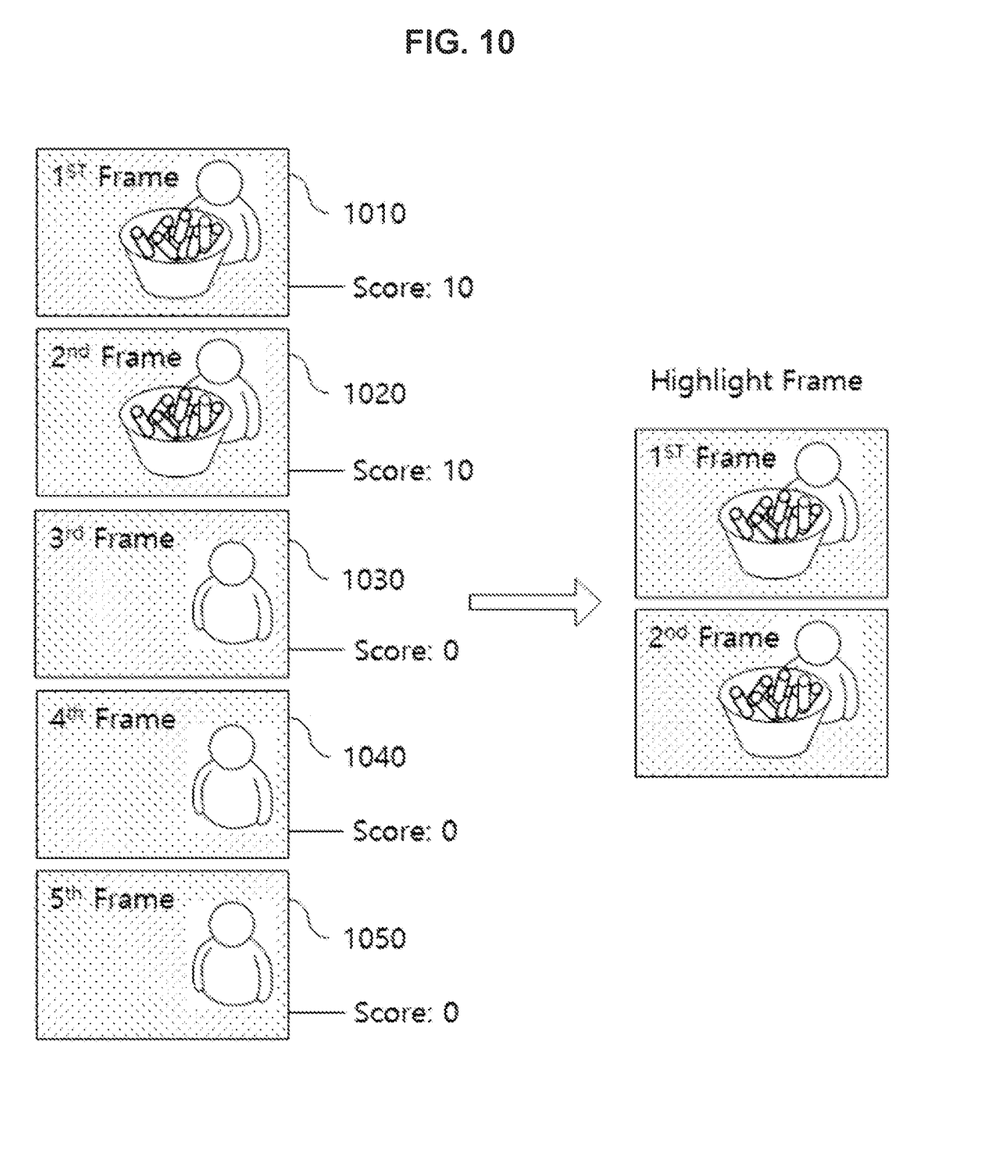

FIG. 3 is a block diagram showing components to be included in a processor of a server according to an embodiment. FIG. 4 is a flowchart showing a video automatic editing method based on machine learning according to an embodiment. FIG. 5 is a diagram showing an example in which at least one highlight frame is extracted in the video automatic editing method based on machine learning shown in FIG. 4. FIG. 6 is a diagram showing an example in which frame information of each of frames included in input video is recognized in the video automatic editing method based on machine learning shown in FIG. 4. FIG. 7 is a diagram showing an example of a table used to extract at least one highlight frame in the video automatic editing method based on machine learning shown in FIG. 4. FIGS. 8 to 10 are diagrams showing frames included in input video for description of calculation methods of calculating a score for a frame in the video automatic editing method based on machine learning shown in FIG. 4.

In the server 160 according to an embodiment, a video automatic editing system implemented by a computer may be configured. The server 160 may be an entity for providing a video automatic editing service to the plurality of electronic devices 110, 120, 130, 140, and 150 that are each a client as a target, and may provide a video automatic editing service corresponding to a service request through a dedicated application installed on the plurality of electronic devices 110, 120, 130, 140, and 150 or access to a web/mobile site related to the server 160. In more detail, the server 160 may provide the video automatic editing service to a user terminal (the first electronic device 110) by performing operations (S410 to S430) shown in FIG. 4.

As shown in FIG. 3, the processor 222 of the server 160 may include a video acquirer 310, a highlight frame extractor 320, and a highlight video generator 330 as components in order for the server 160 to perform the video automatic editing method of FIG. 4. In some embodiments, the components of the processor 222 may selectively be included in or excluded from the processor 222. In some embodiments, the components of the processor 222 may be separated or integrated for representing a function of the processor 222. For example, at least some of the components of the processor 222 may be implemented in the processor 212 included in the first electronic device 110 that is a user terminal.

The components of the processor 222 and the processor 222 may control the server 160 to perform the operations S410 to S430 included in the video automatic editing method of FIG. 4. For example, the components of the processor 222 and the processor 222 may be implemented to execute instruction based on code of an operating system (OS) included in the memory 221 and code of at least one program.

Here, the components of the processor 222 may be expressions of different functions of the processor 222 performed by the processor 222 according to instruction provided by program code stored in the server 160. For example, as functional expression of the processor 222 for acquiring input video, the video acquirer 310 may be used.

The processor 222 may read required instruction from the memory 221 to which instruction associated with control of the server 160 is loaded, prior to operation 3410 (which is not shown as a separate operation in the drawings). In this case, the read instruction may include instruction for control to execute operations S410 to S430 to be described below by the processor 222.

In operation S410, the video acquirer 310 may acquire input video. Hereinafter, the input video may be original filmed video, highlight video of which is to be generated, without being limited thereto, and may be long-form video that is previously edited with a long length, highlight video as short-form video of which is to be generated. Hereinafter, the case in which the highlight video is short-form video with a short length of 1 minute to 15 minutes will be described without being limited thereto, but the highlight video may be long-form video with a long length of 15 minutes or greater, to be generated from original filmed video. As such, whether the highlight video is created as short-form video or is created as long-form video may be determined depending on the number and length of at least one highlight frame extracted from input video. That is, as a condition in which at least one highlight frame is extracted from the input video is adjusted, short-form video or long-form video may be adaptively created.

Then, in operation S420, the highlight frame extractor 320 may extract at least one highlight frame from input video using a highlight extraction model pre-trained through machine learning. In more detail, as shown in FIG. 5, the highlight frame extractor 320 may calculate a score for each of frames included in the input video 520 using a highlight extraction model 510 and may then extract at least one highlight frame 530 based on the score for each of the frames included in the input video 520.

In this case, the highlight frame extractor 320 may calculate the score for each of the frames included in the input video based on frame information of each of the frames included in the input video. Hereinafter, the frame information of each of the frames included in the input video may include the expression, movement, and position of a person in each of the frames included in the input video, the speech content, speech size, and speech speed of the person, the type and change of an object, the type and size of sound, or reaction of viewers who watch the input video.

To this end, the highlight frame extractor 320 may recognize the frame information of each of the frames included in the input video prior to operation S420. For example, the highlight frame extractor 320 may recognize a person in each of the frames included in the input video, speech of the person, an object in the frame, sound, and reaction of viewers when they are watching the corresponding frame (hereinafter, the reaction of viewers refers to comments, chats, etc. of the viewers). In a more specific example, as shown in FIG. 6, the highlight frame extractor 320 may recognize a chat 612 of viewers when they are watching the first frame 610 along with the position, expression, and movement of a person 611 in the first frame 610 within a first frame 610 included in the input video.

As such, in a procedure of recognizing frame information of each of the frames, a frame information recognition model pre-trained through machine learning may be used. For example, the frame information recognition model refers to a recognition algorithm using big data, deep learning, and machine learning, and is well known technology used in a conventional deep learning scheme, or the like, and thus a detailed description thereof will be omitted.

With regard to the case in which a score for each of the frames included in the input video is calculated and at least one highlight frame is extracted based on the calculated scores, referring to FIG. 7, the highlight frame extractor 320 may calculate a score for each of frames 710, 720, and 730 included in the input video and may then extract frames 710 having a score equal to or greater than a preset value as the highlight frames 710. However, the embodiments are not limited thereto, and the highlight frame extractor 320 may extract frames having a score equal to or less than a preset value as highlight frames differently from the drawings.

As such, whether frames having a score equal to or greater than a preset value are extracted as highlight frames or frames having a score equal to less than a preset value may be determined depending on information indicated by the score.

For example, a score for each of the frames included in the input video may indicate a frequency at which frame information of each of the frames included in the input video is repeated in the input video. That is, the highlight frame extractor 320 may use a calculation method of calculating a frequency at which frame information of each of the frames is repeated may be used as a calculation method of calculating a score for each of the frames included in the input video. In a more specific example, as shown in FIG. 8, when a person is sitting in a first frame 810, a second frame 820, and a third frame 830 among frames 810, 820, 830, 840, and 850 included in the input video, and a person is standing in a fourth frame 840 and a fifth frame 850, a frequency at which frame information (information based on which that a person is sitting is recognized) of each of the first frame 810, the second frame 820, and the third frame 830 is repeated in the input video may be higher than a frequency at which frame information (information based on which that a person is standing) of each of the fourth frame 840 and the fifth frame 850 is repeated in the input video. Thus, the highlight frame extractor 320 may calculate a score of each of the first frame 810, the second frame 820, and the third frame 830 as '3' and may calculate a score of each of the fourth frame 840 and the fifth frame 850 as '2'. Frames (the fourth frame 840 and the fifth frame 850) having a low score indicate a scene that occasionally appears in the input video, and thus the highlight frame extractor 320 may extract the frames (the fourth frame 840 and the fifth frame 850) having a low score as highlight frames in order to extract the frames (the fourth frame 840 and the fifth frame 850) that occasionally appear in the input video as the highlight frames.

In another example, a score of each of the frames included in the input video may indicate a degree by which frame information of each of the frames included in the input video is different from frame information of each of the other frames or average frame information of the input video. Accordingly, the highlight frame extractor 320 may use a calculation method of calculating the degree by which frame information of each of the frames is different from frame information of each of the other frames or average frame information of the input video as a calculation method of calculating a score of each of the frames included in the input video. In a more specific example, as shown in FIG. 9, when the volume of voice of a person is '13' in a first frame 910 and a second frame 920 among frames 910, 920, 930, 940, and 950 included in the input video, the volume of voice of a person is '26' in a third frame 930, a fourth frame 940, and a fifth frame 950, and an average volume of voice of a person in the input video is '15', the value '26' as frame information (information on the volume of voice of a person) of each of the third frame 930, the fourth frame 940, and the fifth frame 950 compared with the value '13' as frame information (information on the volume of voice of a person) of each of the first frame 910 and the second frame 920 may differ largely from the value '15' as average frame information (information on the volume of voice of a person) in the input video.

Thus, the highlight frame extractor 320 may calculate a score for each of the first frame 910 and the second frame 920 as '−2' that is a difference value between frame information of each of the first frame 910 and the second frame 920 and average frame information in the input video and may calculate a score of each of the third frame 930, the fourth frame 940, and the fifth frame 950 as '11' that is a difference value between frame information of each of the third frame 930, the fourth frame 940, and the fifth frame 950 and average frame information in the input video as '11'. Frames (the third frame 930, the fourth frame 940 and the fifth frame 950) having a high score indicate a scene that is largely different from a usual scene (average scene) in the input video, and thus the highlight frame extractor 320 may extract the frames (the third frame 930, the fourth frame 940, and the fifth frame 950) having a high score as highlight frames in order to extract the frames (the third frame 930, the fourth frame 940, and the fifth frame 950) that are largely different from the usual scene (average scene) in the input video as the highlight frames.

In another example, a score for each of the frames included in the input video may indicate a degree by which frame information of each of the frames included in the input video is important. That is, the highlight frame extractor 320 may use a calculation method of calculating the degree by which frame information of each of the frames included in the input video is important as a calculation method of calculating a score for each of the frames included in the input video. To this end, the highlight frame extractor 320 may determine the degree by which frame information of each of the frames included in the input video is important depending on a degree by which frame information of each of the frames included in the input video is matched to preset reference frame information. In a more specific example, as shown in FIG. 10, when reference frame information is object information indicating that food as an object appears in a frame, a person and food appear only in a first frame 1010 and a second frame 1020 among frames 1010, 1020, 1030, 1040, and 1050 included in the input video, and only a person appears in the other frames 1030, 1040, and 1050, frame information (object information that appears in a frame) of each of the first frame 1010 and the second frame 1020 may be matched to the preset reference frame information (object information indicating that food as an object appears in a frame) and frame information (object information that appears in a frame) of each of the other frames 1030, 1040, and 1050 may not be matched to the preset reference frame information (object information indicating that food as an object appears in a frame). Thus, the highlight frame extractor 320 may calculate a score for each of the first frame 1010 and the second frame 1020 as '10' and may calculate a score for each of the other frames 1030, 1040, and 1050 as '0'. Frames (the first frame 1010 and the second frame 1020) having a high score indicate a scene matched to a reference scene set to be important, and thus the highlight frame extractor 320 may extract the frames (the first frame 1010 and the second frame 1020) having a high score as highlight frames in order to extract the frames (the first frame 1010 and the second frame 1020) matched to the reference scene set to be important as the highlight frames. Thus far, although the case in which the highlight frame extractor 320 determines whether frame information of each of the frames included in the input video is matched to the preset reference frame information or is not matched thereto at all has been described, the embodiments are not limited thereto, and a degree by which the frame information is matched to the reference frame information may be determined and a score of each of the frames included in the input video may be calculated.

The aforementioned calculation methods of a score may be adaptively used by the highlight frame extractor 320. For example, the highlight frame extractor 320 may receive user input of a calculation method from a user before calculating a score for each of the frames included in the input video and may use the calculation method selected in response to the user input in a procedure of calculating a score for each of the frames included in the input video. In another example, the highlight frame extractor 320 may analyze the input video to classify a category thereof and may then apply a calculation method preset for each category to calculate a score for each of the frames included in the input video.

The highlight frame extraction procedure of the highlight frame extractor 320 may be performed using a highlight extraction model pre-trained through machine learning. For example, the highlight frame extraction model may refer to a calculation algorithm for calculating a score for each of the frames using big data, deep learning, and machine learning and may be pre-trained based on the expression, movement, position, the speech content, speech size, and speech speed of a person in learning videos including the input video, the type and change of an object, the type and size of sound, or reaction of viewers who watch the learning videos.

Then, in operation S430, the highlight video generator 330 may generate at least one extracted highlight frame as highlight video. In more detail, the highlight video generator 330 may generate highlight video by combining the extracted highlight frames.

As such, when at least one highlight frame is extracted using only a score for each of the frames included in the input video, scene transition between highlight frames or flow of video may not be smooth. Thus, the highlight frame extractor 320 may additionally extract frames before and after a preset range based on at least one extracted highlight frame, and thus the highlight video generator 330 may generate highlight video by combining the at least one extracted highlight frame and the before and after frames.

The aforementioned system or apparatus may be implemented as a hardware component, a software component, and/or a combination of the hardware component and the software component. For example, the system, the apparatus, and the component that have been described in the embodiments may be implemented using one or more general-purpose computers or special-purpose computers, such as a processor, a controller, an arithmetic logic unit (ALU), a digital signal processor, a microcomputer, a field programmable array (FPA), a programmable logic unit (PLU), a microprocessor, or other devices for executing and responding to instruction. A processing apparatus may execute an operating system (OS) and at least one software application executed on the OS. The processing apparatus may also access, store, manipulate, process, and generate in response to execution of software. For convenience of understanding, the case in which one processing apparatus is used is described, but it would be obvious to one of ordinary skill in the art that the processing apparatus includes a plurality of processing elements and/or a plurality of types of processing elements. For example, the processing apparatus may include a plurality of processors or one processor and one controller. Other processing configurations such as a parallel processor may also be used.

Software may include a computer program, code, instruction, or one or more combinations thereof and may configure a processing apparatus to operate as desired or may independently or collectively instruct the processing apparatus to operate as desired. Software and/or data may be permanently or temporarily embodied in any type of machine, a component, a physical device, virtual equipment, a computer store medium or device, or a transmitted signal wave in order to be interpreted by the processing apparatus or to provide instruction or data to the processing apparatus. Software may be distributed on a computer system connected to a network and may be stored or executed in a distributed manner. Software and data may be stored in one or more computer-readable recording medium.

The methods according to the embodiments may be embodied in the form of program instruction to be executed by various computer devices and may be stored in a computer-readable medium. The computer-readable medium may include program instruction, a data file, a data structure, etc. alone or in combination. The program instruction recorded in the medium may be specially designed and configured for the embodiments or may be well known and available to one of skilled in the art of computer software. Examples of a computer readable recording medium include magnetic media such as hard disks, floppy disks and magnetic tapes, optical media such as CD-ROMs and DVDs, magneto-optical media such as floptical disks, or hardware devices such as ROMs, RAMs and flash memories, which are specially configured to store and execute program instruction. Examples of the program instruction include a machine language code created by a compiler and a high-level language code executable by a computer using an interpreter and the like. The hardware apparatus may be configured to operate as one or more software modules in order to perform the operations according to the embodiment, and the converse may also be possible.

Embodiments propose a video automatic editing system and method for automatically creating highlight video that is short-form video content using a highlight extraction model that is pre-trained through machine learning to prevent inconvenience of creating short-form video content by single creators and to improve the quality of the short-form video content.

However, the effects of the present disclosure are not limited to the above effects, and may be variously expanded without departing from the spirit and scope of the present disclosure.

As described above, although the embodiments have been described with reference to the limited embodiments and drawings, various modifications and variations are possible from the above description by one of ordinary skill in the art. For example, appropriate results may be achieved even if the aforementioned technologies are performed in an order different from the described method, and/or the aforementioned components of a system, structure, apparatus, circuit, etc. are coupled or combined in a different form than the aforementioned method, or other components or equivalents are displaced or replaced.

Therefore, other implementations, other embodiments, and equivalents to the claims are also within the scope of the following claims.

What is claimed is:

1. A video automatic editing system based on machine learning comprising at least one processor,
   wherein the at least one processor includes:
   a video acquirer configured to acquire input video;
   a highlight frame extractor configured to extract at least one highlight frame from the input video using a highlight extraction model pre-trained through machine learning; and
   a highlight video generator configured to generate highlight video from the at least one extracted highlight frame,
   wherein the highlight frame extractor calculates a score for each of frames included in the input video using the highlight extraction model and extracts the at least one highlight frame based on the score for each of frames included in the input video,
   wherein the highlight frame extractor calculates the score for each of frames included in the input video based on frame information of each of the frames included in the input video,
   wherein the score for each of the frames included in the input video indicates a frequency at which the frame information of each of the frames included in the input video is repeated in the input video.

2. The video automatic editing system based on machine learning of claim 1, wherein the frame information includes expression, movement, and a position of a person in each of the frames included in the input video, speech content, a speech size, and speech speed of the person, a type and change of an object, a type and size of sound, or reaction of viewers who watch the input video.

3. The video automatic editing system based on machine learning of claim 1, wherein, in response to extraction of frames before and after a preset range together based on the at least one extracted highlight frame, the highlight video generator generates the highlight video by combining the at least one extracted highlight frame and the before and after frames.

4. The video automatic editing system based on machine learning of claim 2, wherein the highlight frame extractor calculates the score for each of the frame included in the input video using a calculation method selected in response to user input for calculation methods of calculating the score of each of the frames included in the input video.

5. The video automatic editing system based on machine learning of claim 1, wherein the highlight extraction model is pre-trained through the machine learning based on expression, movement, a position, speech content, a speech size, and speech speed of a person in learning videos including the input video, a type and change of an object, a type and size of sound, or reaction of viewers who watch the learning videos.

6. The video automatic editing system based on machine learning of claim 1, wherein a total number of repetitions of frame information of the at least one highlight frame is lower than a total number of repetitions of frame information of remaining frames in the input video.

7. A video automatic editing system based on machine learning comprising at least one processor,
wherein the at least one processor includes:
a video acquirer configured to acquire input video;
a highlight frame extractor configured to extract at least one highlight frame from the input video using a highlight extraction model pre-trained through machine learning; and
a highlight video generator configured to generate highlight video from the at least one extracted highlight frame,
wherein the highlight frame extractor calculates a score for each of frames included in the input video using the highlight extraction model and extracts the at least one highlight frame based on the score for each of frames included in the input video,
wherein the highlight frame extractor calculates the score for each of frames included in the input video based on frame information of each of the frames included in the input video,
wherein the score for each of the frames included in the input video indicates a degree by which the frame information of each of the frames included in the input video is different from average frame information of the input video.

8. The video automatic editing system based on machine learning of claim 7, wherein a difference between frame information of the at least one highlight frame and the average frame information is greater than a difference between frame information of remaining frames in the input video and the average frame information.

9. A video automatic editing system based on machine learning comprising at least one processor,
wherein the at least one processor includes:
a video acquirer configured to acquire input video;
a highlight frame extractor configured to extract at least one highlight frame from the input video using a highlight extraction model pre-trained through machine learning; and
a highlight video generator configured to generate highlight video from the at least one extracted highlight frame,
wherein the highlight frame extractor calculates a score for each of frames included in the input video using the highlight extraction model and extracts the at least one highlight frame based on the score for each of frames included in the input video,
wherein the highlight frame extractor calculates the score for each of frames included in the input video based on frame information of each of the frames included in the input video,
wherein the score for each of the frames included in the input video indicates a degree by which the frame information of each of the frames included in the input video is matched to preset reference frame information.

10. The video automatic editing system based on machine learning of claim 9, wherein frame information of the at least one highlight frame matches to the preset reference frame information.

* * * * *